Aug. 18, 1970  R. S. ODLE, JR., ET AL  3,524,263
CONTROL CIRCUIT FOR A LAUNDRY APPLIANCE
Filed April 3, 1968  2 Sheets-Sheet 1

INVENTORS
RALPH S. ODLE JR.
THEODORE S. KOTYUK

BY *[signature]* ATTORNEYS

Aug. 18, 1970        R. S. ODLE, JR., ET AL        3,524,263
            CONTROL CIRCUIT FOR A LAUNDRY APPLIANCE
Filed April 3, 1968                              2 Sheets-Sheet 2
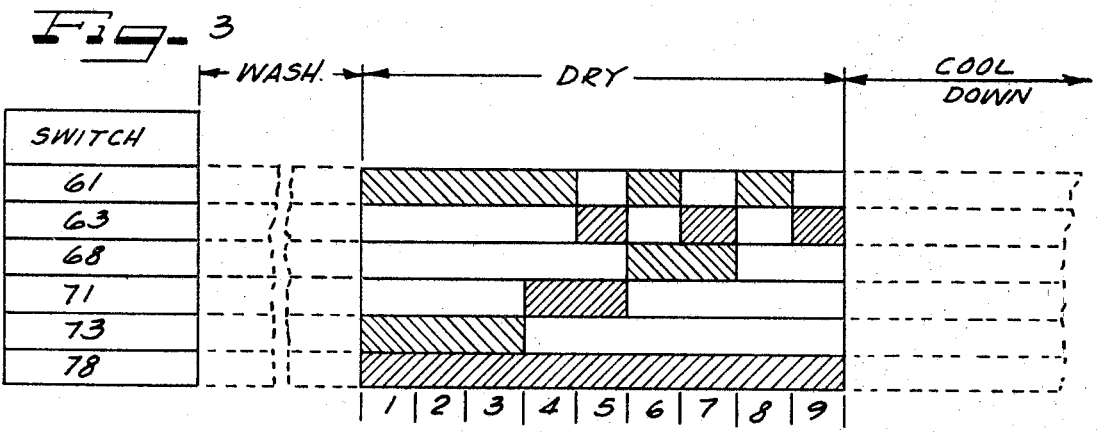
Fig-3
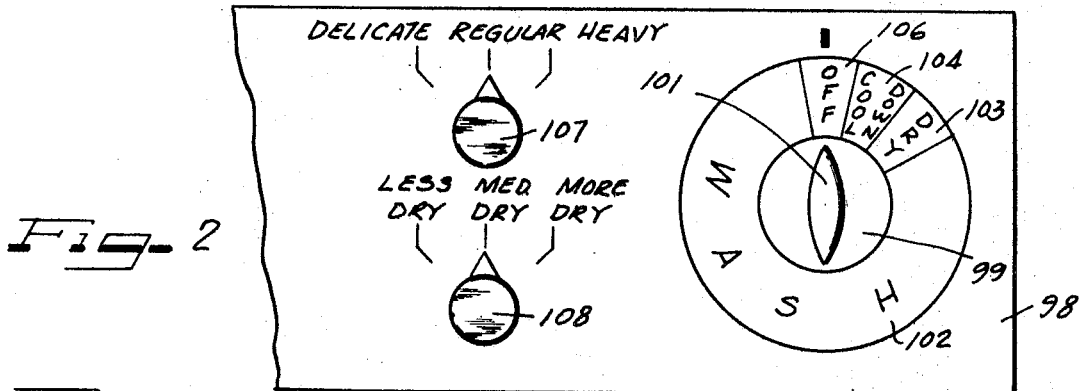
Fig-2
Fig-4
| SWITCH 107 | OPEN | CLOSED |
|---|---|---|
| DELICATE | 93, 94 | 92 |
| REGULAR | 92, 94 | 93 |
| HEAVY | 92, 93 | 94 |
| SWITCH 108 | OPEN | CLOSED |
|---|---|---|
| LESS DRY |  | 97, 98 |
| MEDIUM DRY | 98 | 97 |
| MORE DRY | 97, 98 |  |
Fig-5
INVENTORS
RALPH S. ODLE JR.
THEODORE S. KOTYUK
BY _____ ATTORNEYS

United States Patent Office 3,524,263
Patented Aug. 18, 1970

3,524,263
CONTROL CIRCUIT FOR A LAUNDRY APPLIANCE
Ralph S. Odle, Jr., Michigan City, Ind., and Theodore S. Kotyuk, St. Joseph, Mich., assignors to Whirlpool Corporation, Benton Harbor, Mich., a corporation of Delaware
Filed Apr. 3, 1968, Ser. No. 718,433
Int. Cl. F26b 13/10
U.S. Cl. 34—45                               7 Claims

ABSTRACT OF THE DISCLOSURE

A control circuit for a laundry machine, as for example, a combination washer-dryer which uses temperature responsive means in cooperation with a timer to count the number of heater cycles during the drying operation and terminate operation after a predetermined number of cycles have been counted as preset by the machine operator. The dry control of this invention advances the timer both when the thermostat cuts off the heaters and also when it turns them back on. Selector means allow different times and temperatures of drying so that the drying cycle may be varied at the discretion of the operator.

CROSS-REFERENCE TO RELATED APPLICATION

The copending application entitled "Dryer Control System" invented by Wilbur W. Jarvis and assigned to the assignee of the present invention, discloses a dryer control for a laundry machine which is temperature responsive and which utilizes the timer for intermittent operation.

The present invention allows presetting of both the drying temperature and moisture retention at which the drying cycle will terminate.

BACKGROUND OF THE INVENTION

Field of the invention

A control circuit for a laundry appliance as, for example, a combination washer-dryer in which temperature responsive means in cooperation with the timer is utilized to count the number of heater cycles near the end of the drying step to terminate operation after a predetermined number of cycles as selected by the machine operator.

Description of the prior art

Pat. No. 1,519,234; 2,796,679 and 2,815,416 relate to heater and dryer control systems.

Pat. No. 1,519,234 discloses a heater control circuit in which a stepping switch cooperates with a bimetallic switch to alternately power and deenergize a heater. However, the stepping switch is not a timer and the principle of "overlapping" the closing of timer switch to control timer advancement is not disclosed. Also, this structure is not utilized as a dryer control circuit in a laundry appliance.

Pat. Nos. 2,796,679 and 2,815,416 are both directed to ratchet mechanisms which count the number of heater cycles near the end of the drying step and terminate operation after a preset number of such cycles.

SUMMARY OF THE INVENTION

A control circuit for a laundry appliance as, for example, a combination washer-dryer which uses temperature responsive means in cooperation with timer means to count the number of heater cycles and terminate operation after a number of cycles as preset by the machine operator. The "counting" is accomplished not by a ratchet means as in the prior art but by a unique timer sequence which "overlaps" a pair of timer switches controlling cycle advancement.

During each heat-up and cool-down cycle of the heater for the washer-dryer, the timer is briefly energized. After a preset number of such brief energizations, the drying operation is terminated. Such structure and operation is not shown or disclosed in the prior art.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 2 is a partial view of the control panel of the washer-dryer of this invention;

FIG. 3 is a timer sequence chart for the timer utilized by the instant invention;

FIG. 4 is a chart illustrating the position of various switches resulting from different settings of a selected control on the FIG. 2 control panel; and FIG. 5 is another chart showing the position of various switches resulting from different settings of another control shown on the FIG. 2 control panel.

DESCRIPTION OF THE PREFERRED EMBODIMENT

Figure 1:
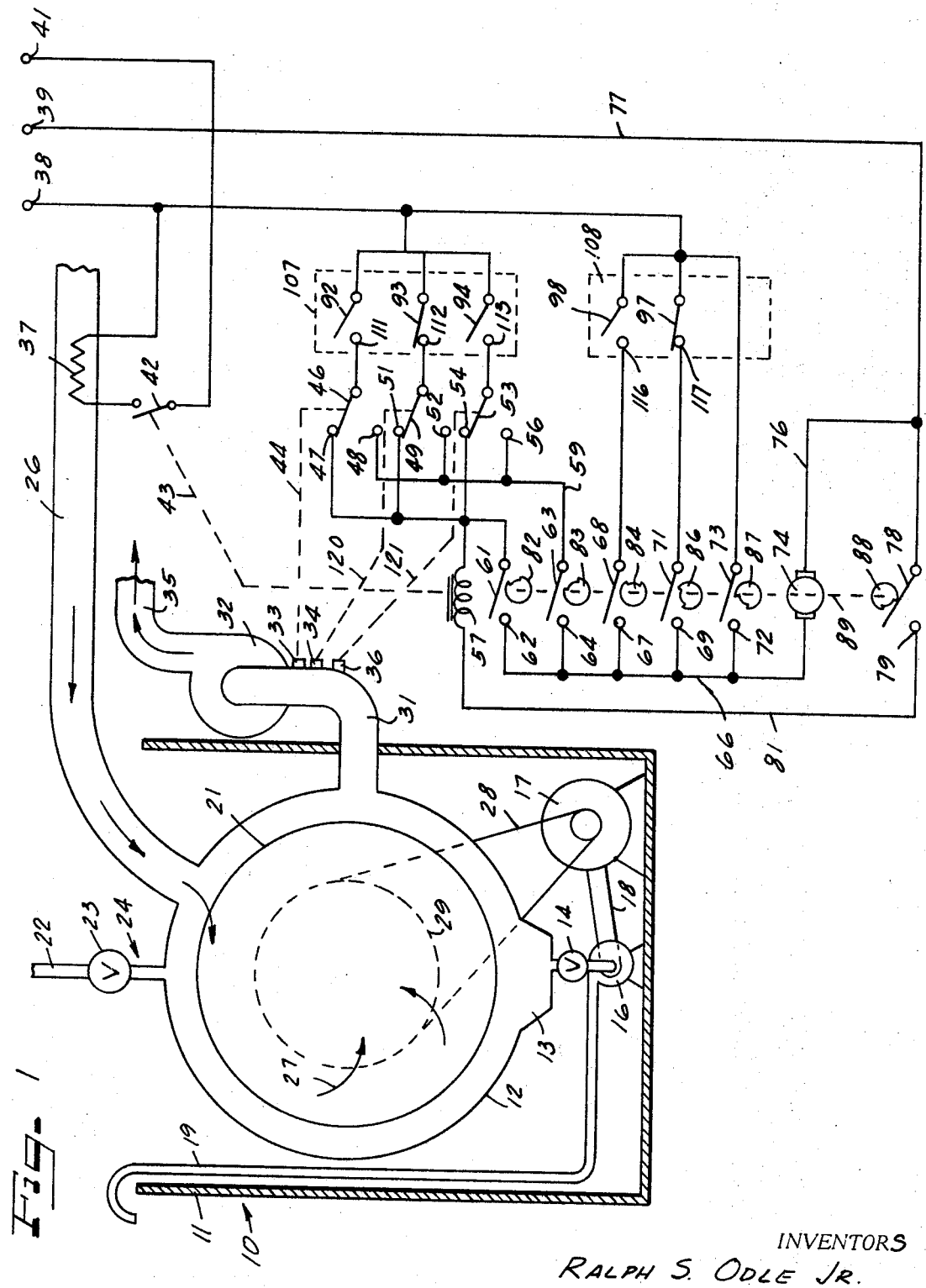
FIG. 1 is a schematic view of a combination washer-dryer and the control circuit of the present invention.

FIG. 1 shows schematically a combination washer-dryer 10 and that portion of its control circuitry which comprises the present invention. The combination washer-dryer includes a cabinet 11 in which is mounted a cylindrical water-tight tank 12. A cylinder 21 is journalled for rotation within tank 12 and an inlet valve 23 is connected to an inlet water supply 22 and supplies water to the tank 12 through the vacuum break 24. Drainage of water from tank 12 is controlled by a valve 14 which is mounted in the bottom portion of a sump 13. A pump 16 is connected to a conduit 19 and forces water therethrough during the drain operation. A motor 17 is connected by a belt 18 to drive pump 16. Motor 17 also drives cylinder 21 through a belt 28 which fits over a pulley 29 mounted to cylinder 21.

During the drying operation of the combination washer-dryer, air is conducted through an air inlet 26 over an electric heater 37 (although an electric heater 37 is illustrated, it is to be realized that any other type of heater such as a gas burner may also be used). The heated air in duct 26 passes into cylinder 21, as generally indicated by the arrows 27. After absorbing moisture from the clothing load being tumbled in cylinder 21, the moisture laden air is driven through an exhaust duct 31 by suction blower 32 and passes out exhaust stack 35.

Since the structure disclosed up to this point is conventional in washer-dryer combinations, a more detailed description of the fluid circuitry, the driving structure and the portion of the control circuit actuating various electromechanical components in the drive and fluid circuitry will not be given, since these elements are well known to those skilled in the art.

FIG. 2 is a partial view of the control panel 98 of a washer-dryer which utilizes the present invention. A timer dial 99 has a pointer portion 101 which may be read against indicia printed about its surface. It is to be noted that the major portion 102 of the timer is utilized for the wash portion of the cycle of operation. This is advantageous, since most of the peripheral area of the timer cams can be devoted to switching circuity controlling the wash cycle. Thus, a high flexible washing operation can be obtained due to the large portion of the timer devoted to it. Small section 103 of the timer dial (which might represent approximately nine minutes of the timer time) is the only portion of the timer which must be utilized for the control of the drying operation. Segment 104 illustrates the cool-down time and segment 106 illustrates the "off" time of the washer-dryer. Selector knob 107 allows a deliciate, regular or heavy dry setting to be made to properly regulate the dryer for delicate, regular or heavy fabrics. Dryness selector knob 108 allows the housewife to preset the moisture retention at which the drying cycle of operation will be terminated. Thus, the knob 108 may be set, for example, to less dry, medium dry or more dry termination.

Referring again to FIG. 1, three power terminals 38, 39, and 41 may be connected to a suitable power supply such that 110 volts is impressed from terminal 39 to terminal 38 and from terminal 39 to terminal 41. Thus, 220 volts exists between terminals 38 and 41. The heater 37 has one side connected to the terminal 38 and the other side connected to a switch 42. The other side of switch 42 is connected to terminal 41.

Terminal 38 is connected to temperature selector switch 107. Three switches have their movable contacts 92, 93, and 94 connected respectively to terminal 38. Movable contact 92 may be moved into engagement with contact 111, for example. Contact 111 is connected to a switch 46 which, in one position, engages a contact 47 and in a second position engages a contact 48. Switch 93 may be moved to engage contact 112 which is connected to switch 49 which in a first position engages contact 51 and in a second position engages contact 52. Switch 94 is movable to engage contact 113 which is connected to switch 53. Switch 53 is movable between contacts 54 and 56. Contacts 47, 51, and 54 are connected together and to a heater energize relay 57. Heater energize relay 57 is connected by a mechanical linkage 43 to control the position of the heater switch 42. The other side of the relay 57 is connected to a lead 81 which is connected to contact 79 of a switch 78. Switch 78 is connected by lead 77 to terminal 39. A timer motor 74 has one side connected by lead 76 to the lead 77. The other side of the timer motor is connected to a lead 66 which is connected to terminals 62, 64, 67, 69, and 72. A switch 61 is connected by lead 58 to terminals 47, 51, and 54 and is engageable with contact 62.

Contacts 48, 52, and 56 are connected together and to a lead 59 which is connected to a switch 63. Switch 63 is engageable with contact 64. Timer motor 74 has an output shaft 89 which carries a plurality of timer cams 82, 83, 84, 86, 87, and 88. Timer cam 88, for example, controls position of switch 78. Cam 82 controls switch 61. Cam 83 controls switch 63. Cam 84 controls a switch 68 which is engageable with contact 67. Cam 86 controls a switch 71 which is engageable with contact 69, and cam 87 controls switch 73 which is engageable with contact 72.

Terminal 38 is also connected to switches 98 and 97 in dryness control 108. Stationary contact 116 of switch 98 is connected to switch 68. Stationary contact 117 of switch 97 is connected to switch 71. Switch 73 is connected to terminal 38.

A group of three thermostatic elements 33, 34, and 36 are mounted in exhaust duct 31. Thermostatic element 33 is connected by a linkage 44 to switch 46, thermostatic element 34 is connected by a linkage 120 to switch 49, and thermostatic element 36 is connected by a linkage 121 to switch 53. The thermostatic elements 33, 34, and 36 are actuated at different temperatures. Thermostatic element 33 might energize switch 46 at a temperature of 125° F., for example. Thermostatic element 34 might energize switch 49 at a temperature of 135° F. Thermostatic element 36 might energize switch 53 at a temperature of 145° F.

In operation, temperature selection knob 107 may be set to delicate, regular, or heavy, and dryness selector knob 108 may be set to damp dry, medium dry, or bone dry. As shown best in the switch closure chart of FIG. 4, with knob 107 set for delicate drying, switches 93 and 94 are open and switch 92 is closed. For regular dry, switches 92 and 94 are open, and switch 93 is closed. For heavy dry, switches 92 and 93 are open and switch 94 is closed. FIG. 5 illustrates the closure conditions for the various switches controlled by dryness selector knob 108. For less dry, switches 97 and 98 are closed. For medium dry, switch 98 is open and switch 97 is closed. For more dry, switches 97 and 98 are open.

The operation of the dry control of the instant invention will now be described assuming that knob 107 is set to medium and knob 108 is set to regular dry. This results in closure of switches 93 and 97, whereas, switches 92, 94, and 98 remain open as shown in FIG. 1. This insures that the air temperature passing through cylinder 34 will be controlled by thermostatic element 34 and the dry cycle will be terminated after two heater cycles are counted. Assuming the wash step is complete, the combination washer-dryer enters the dry portion of the cycle. With switch 97 closed as shown in FIG. 1, an electrical path is establish to the timer motor 74 from terminal 38 through switch 73. This allows the timer motor 74 to operate for a period of three minutes. (See FIG. 3). At the end of the three-minute time period, switch 73 will be opened and switch 71 will close. Since switch 97 in series with switch 71 is closed, the timer will advance for two more minutes whereupon switch 71 will open. As switch 71 opens, switch 61 closes. Since thermostatically actuated switch 49 is in engagement with contact 51, the timer motor advances for one more minute. At this time, switch 61 opens. This stops timer motor 74. It is to be noted that switch 68 and timer cam 84 do not supply power to the motor 74 after switch 61 opens because the switch 98 is open. Also, timer-actuated switch 63, which is now closed, does not supply power to the timer motor 74 since the thermostatically actuated switch 49 is not in engagement with contact 52. However, note that the timer-actuated switch 78 is closed even though the timer motor 74 has stopped. This establishes power to the heater relay 58 from line 77 through switch 93, thermostatically-controlled switch 49 and closed timer switch 78. Energization of relay 57 closes heater energize switch 42 and the heater will be energized. The machine is then in a normal drying operation and will remain as long as the thermostatically actuated switch 49 is in the position shown in FIG. 1.

However, when the exhaust stack temperature in duct 31 rises above 135° F. (indicating that the clothing within the cylinder 21 is getting dry), thermostatic element 34 will transfer switch 49 to contact 52. This terminates power to the relay 57 and switch 42 opens. Thus, heat input to the air passing through duct 31 is terminated. The engagement of switch 49 with contact 52 establishes power to timer motor 74 through closed timer-actuated switch 63. As shown in FIG. 3, the timer-actuated switch 63 remains closed for a timer-run period of one minute. Thus, at seven minutes, the timer-actuated switch 63 opens and simultaneously switch 61 closes. However, since switch 49 is not in engagement with contact 51, the timer motor does not advance.

After a period of time sufficient for the clothing in cylinder 21 to cool down, the temperature in exhaust stack 31 drops and thermostatic element 34 moves switch 49 from engagement with contact 52 back into engagement with contact 51. This re-establishes power to relay 57 and heater 37 is again energized. Timer motor 74 is also energized through the timer-actuated switch 61 for a period of one minute, whereupon switch 61 will open and switch 63 will close. Thus the timer advances from seven minutes to eight minutes as indicated in FIG. 3, whereupon it will again stop. As temperature rises once more in the exhaust duct 31, the series of events will be repeated and timer motor 74 will be advanced from eight minutes to nine minutes when switch 49 is moved to engage contact 52 by the thermostat 34. This terminates the drying operation. It is thus seen with the dryness selector 108 set to close switch 97, exactly two heater cycles are allowed before the drying operation is terminated. Further, setting of temperature selector 107 to the regular position allows the thermostatic element 34 to control the temperature at which cycling takes place. If the temperature selector 107 had been set to either delicate or heavy, thermostatic elements 33 or 36 respectively would have controlled the temperature at which cycling was initiated. Thus, the temperature of air used to dry the clothing is selected by the switches 92, 93 and 94.

If the housewife had initially set the dryness selector 108 to less dry, switch 97 and switch 98 would both be closed. This would allow timer-actuated switch 68 to run the timer for eight minutes at the beginning of the drying operation. Thus, only one thermostatic cycle would be allowed before the drying operation was terminated, thereby resulting in less dry clothing. Alternatively, if the dryness selector knob 108 had been set to more dry, both switches 98 and 97 would remain open and timer-actuated switch 73 would allow the timer motor to advance only three minutes at the beginning of the drying cycle. This would insure that three heater cycles of operation would take place prior to termination of the drying step, thus insuring a more dry condition of the clothing load upon removal from the dryer.

It is to be realized that the timing cams 82, 83, 84, 86, 87, and 88 are so formed and phased on the shaft 89 that the switches 61, 63, 68, 71, 73, and 78 are properly timed for the proper operation of the washer-dryer.

Although minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A heater and timer control for a laundry machine having, a heater to heat drying air, a plurality of temperature sensors and a plurality of temperature switches each actuated by one of the temperature sensors, a plurality of temperature selector switches connected in circuit with the plurality of temperature switches, a plurality of timer temperature control switches connected in circuit with the plurality of temperature switches and the plurality of temperature selector switches, a timer connected in circuit with the temperature switches, the temperature selector switches, and said temperature control switches, and said timer having a plurality of cams with a first portion of said cams actuating said plurality of timer temperature control switches.

2. A heater and timer control according to claim 1 comprising a moisture control which has a plurality of moisture control switches, a plurality of moisture timer switches connected to the moisture control switches and a second portion of said cams driven by the timer and mounted to actuate the plurality of moisture timer switches.

3. A heater and timer control wherein the timer is connected in circuit with the moisture control switches and the moisture timer switches in the apparatus of claim 2.

4. A heater and timer control according to claim 3 including a heater control connected in circuit with the temperature selector switches and the temperature control switches and the heater control turning the heater on and off.

5. A heater and timer control according to claim 4 wherein the first and second portions of the plurality of cams are formed so that the various switches controlled by the cams are opened and closed at different times so that the cycles of energization of the heater and timer overlap.

6. A heater and timer according to claim 5 wherein the number of on and off cycles of the heater and timer is controlled by the settings of the moisture control switches in the moisture control.

7. A heater and timer control according to claim 5 wherein the temperature switches each have two output contacts and with a first contact of each temperature switch connected together and to one timer temperature control switch and second contacts of each temperature switch connected together and to a second timer temperature control switch.

References Cited

UNITED STATES PATENTS

| | | | |
|---|---|---|---|
| 2,796,679 | 6/1957 | Dunkelman | 34—45 |
| 3,397,461 | 8/1968 | Fogt et al. | 34—45 |
| 3,401,464 | 9/1968 | Fogt et al. | 34—45 |

LLOYD L. KING, Primary Examiner

U.S. Cl. X.R.

34—133